United States Patent
Sitta et al.

(10) Patent No.: US 11,745,677 B2
(45) Date of Patent: Sep. 5, 2023

(54) POWER INTERFACE CONTROL DEVICE OF A VEHICLE PROPULSION BATTERY

(71) Applicant: FERRARI S.p.A., Modena (IT)

(72) Inventors: Ugo Sitta, Renazzo Cento (IT); Luca Poggio, Casalecchio di Reno (IT); Andrea Benoit Abbiati, Cambiago (IT)

(73) Assignee: FERRARI S.P.A., Modena (IT)

( * ) Notice: Subject to any disclaimer, the term of this patent is extended or adjusted under 35 U.S.C. 154(b) by 847 days.

(21) Appl. No.: 16/281,556

(22) Filed: Feb. 21, 2019

(65) Prior Publication Data

US 2019/0256017 A1 Aug. 22, 2019

(30) Foreign Application Priority Data

Feb. 21, 2018 (IT) .................. 102018000002907

(51) Int. Cl.
| | |
|---|---|
| *B60R 16/03* | (2006.01) |
| *B60L 50/60* | (2019.01) |
| *H01R 13/66* | (2006.01) |
| *H01R 27/02* | (2006.01) |
| *B60L 53/14* | (2019.01) |
| *B60L 53/22* | (2019.01) |

(Continued)

(52) U.S. Cl.
CPC .............. *B60R 16/03* (2013.01); *B60L 50/60* (2019.02); *B60L 53/14* (2019.02); *B60L 53/22* (2019.02); *H01R 13/6683* (2013.01); *H01R 27/02* (2013.01); *B60K 6/26* (2013.01); *B60K 6/28* (2013.01); *B60L 2210/10* (2013.01); *B60L 2240/547* (2013.01); *B60L 2240/549* (2013.01); *B60Y 2200/91* (2013.01); *B60Y 2200/92* (2013.01); *H01R 2201/26* (2013.01)

(58) Field of Classification Search
CPC .......... B60R 16/03; B60L 50/60; B60L 53/14; B60L 53/22; B60L 2210/10; B60L 2240/547; B60L 2240/549
See application file for complete search history.

(56) References Cited

U.S. PATENT DOCUMENTS

| | | | |
|---|---|---|---|
| 2011/0187184 A1 * | 8/2011 | Ichikawa ................ | B60L 55/00 307/10.1 |
| 2016/0272073 A1 * | 9/2016 | Hosaka ................... | B60L 50/66 |
| 2018/0110150 A1 * | 4/2018 | Blanchet ................. | B60L 53/51 |

FOREIGN PATENT DOCUMENTS

| | | | |
|---|---|---|---|
| DE | 102017109992 A1 * | 12/2017 | ............. G01R 15/14 |
| EP | 0291989 A1 | 11/1988 | |
| EP | 2255990 A1 | 12/2010 | |

(Continued)

OTHER PUBLICATIONS

Translated and annotated Halemeier (EP-0291989) (Year: 1988).*

(Continued)

*Primary Examiner* — James M McPherson
*Assistant Examiner* — Kyle J Kingsland
(74) *Attorney, Agent, or Firm* — CANTOR COLBURN LLP

(57) ABSTRACT

Power interface control device of a vehicle propulsion battery potential ports to carry out differential potential measurements, a current sensor to measure a current supplied by the propulsion battery and a closed container made of insulating material to which said ports and said sensor are associated, wherein said container comprises connection means to allow a mechanical coupling between the container and said electrical conductor.

14 Claims, 3 Drawing Sheets

(51) Int. Cl.
*B60K 6/26* (2007.10)
*B60K 6/28* (2007.10)

(56) References Cited

FOREIGN PATENT DOCUMENTS

EP 2509183 A1 10/2012
FR 2720201 A1 * 11/1995 .......... B60L 11/1811

OTHER PUBLICATIONS

Translated and annotated Wand (DE-102017109992-A1) (Year: 2017).*
International Search Report issued in International Application No. IT201800002907, completed Jul. 6, 2018; 9 pages.
Search Report issued European Patent Application No. 19158673.4-1205, dated Jul. 23, 2019 (date of completion, Jul. 16, 2019); 8 pages.

* cited by examiner

POWER INTERFACE CONTROL DEVICE OF A VEHICLE PROPULSION BATTERY

CROSS-REFERENCE TO RELATED APPLICATIONS

This patent application claims priority from Italian patent application no. 102018000002907 filed on Feb. 21, 2018, the entire disclosure of which is incorporated herein by reference.

FIELD OF THE INVENTION

The present invention relates to the field of control systems associated with the terminals of a vehicle propulsion battery of an electric or hybrid vehicle.

PRIOR ART

Electric or hybrid vehicles are equipped with a propulsion battery.

This comprises a plurality of interconnected cells to offer the external terminals of the propulsion battery voltages much higher than 100V.

The propulsion battery, when operative, is electrically connected to a vehicle electric power network to supply at least one propulsion motor through a pair of electrical conductors.

Each of said conductors has a switch designed to open the electric circuit defining a power interface between the battery and the vehicle electric power network. According to technical standards, it is necessary to monitor the correct opening and closing of both switches. Furthermore, it is necessary to monitor the current supply. To this purpose, voltage and current sensors are provided at the electrical interface between the propulsion battery and the vehicle electric power network.

The information obtained from this monitoring must be transmitted through a data bus to the vehicle data network for successive processing.

At the same time, the vehicle data bus must be able to interact with the aforementioned switches to control any opening and closing thereof.

It is therefore clear that different sensors, driving elements and electrical conductors must be installed to carry out the aforementioned operations.

The arrangement of these components and the length of the electrical conductors need to be optimized to contain encumbrance and weight on board the vehicle.

SUMMARY OF THE INVENTION

The object of the present invention is to indicate an electrical interface control device for a vehicle propulsion battery, which allows optimizing and containing encumbrance and weight of the components necessary to carry out the aforementioned current and voltage measurements and to control the switches located on the positive and negative terminals of the propulsion battery.

The basic idea of the present invention is to enclose in a single container the measurement electronics of the aforementioned voltages and currents and to connect said container directly to a terminal/conductor of the propulsion battery.

Advantageously, according to a preferred variant of the invention, only two electrical conductors related to the data communication bus towards the vehicle data network must be brought to the propulsion battery interface with the vehicle electric power network.

The conductors necessary for the voltage and current measurements start from the aforementioned container and may have lengths of some centimetres.

According to another preferred variant of the invention, the power supply of the electronics contained in said container is achieved by means of a further pair of electrical conductors connected to a buffer battery independent of the propulsion battery.

According to a further preferred variant of the invention to be combined with the previous ones, the container has means for rapidly connecting it to a terminal of the propulsion battery or a conductor connected to the terminal. Preferably, the connection means also allow an electrical contact with the terminal in order to measure a relative electrical potential.

According to a preferred variant to be combined with the preceding ones, the same container houses processing means configured to process the effected 5 measurements, data communication means to allow the interoperability of said processing means with the vehicle data network, switch control means arranged on the terminals of the propulsion battery or on conductors galvanically connected to them, and preferably galvanic uncoupling means to isolate the vehicle data network from the terminals of the propulsion battery. The processing means can be further programmed to communicate said first three potential differential measurements for the $V0$, $V1$ and $V2$ voltages and/or a further potential measurement of voltage $V4$ and/or said first measurement of the current passing through said electrical conductor.

The claims describe preferred variants of the invention, thus forming an integral part of the present description.

BRIEF DESCRIPTION OF THE FIGURES

Further aims and advantages of the present invention will become clear from the following detailed description of an embodiment thereof (and of its variants) and from the enclosed figures, provided purely as an explanatory and non-limiting example, in which.

The same numbers and reference letters in the figures identify the same elements or components.

In the present description, the term "second" component does not imply the presence of a "first" component. These terms are in fact used only for clarity's sake and should not be understood in a limiting way.

DETAILED DESCRIPTION OF EMBODIMENTS

What described above with regard to the prior art is here referred to in its entirety, with a particular regard to the concept of the power interface between the propulsion battery BP and the electric network EN to which the battery is generally connected when the propulsion battery is operating.

Said interface comprises a pair of electrical conductors BB1 and BB2, also called bus-bars, defining a power supply line on which a first and a second electrical switch INT1, INT2 are respectively housed.

These electrical switches can be controlled and are generally called remote switches because they can be controlled remotely.

They must be able to section the circuit under any operating condition, both when the battery is supplying no power, so that the no-load voltage on it is maximum, and when the battery supplies a relative maximum current.

Figure 1:
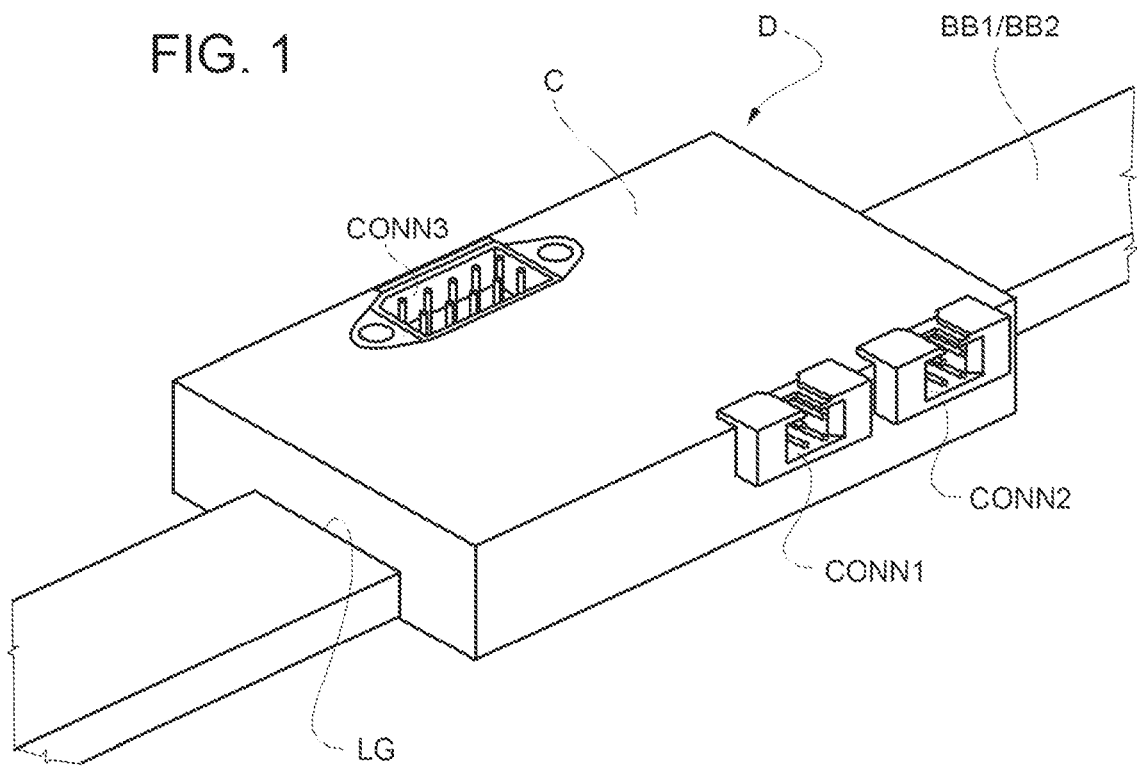
FIG. 1 shows a perspective view of an electric terminal of a propulsion battery to which the device object of the present invention is applied.
Figure 3:
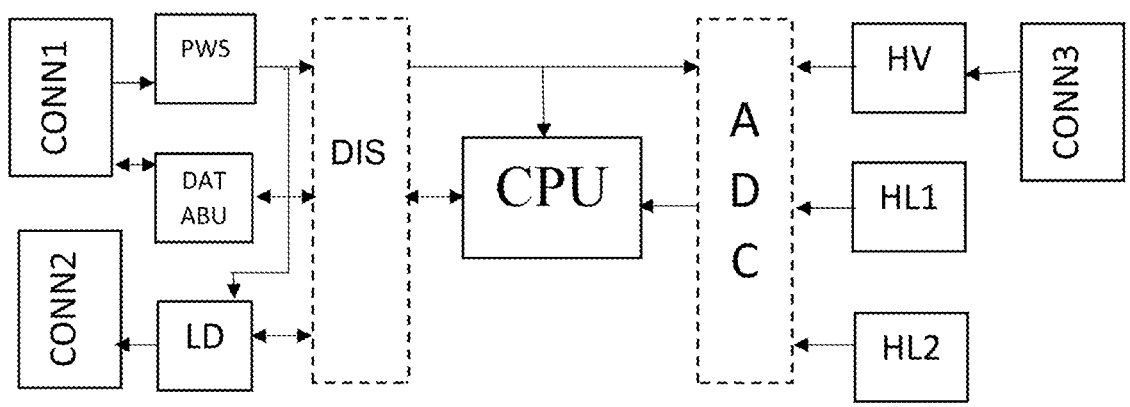
FIG. 3 shows a circuit diagram of the device of FIG. 1.

With reference to FIGS. 1 and 3, the control device D of said vehicle power interface comprises at least:

first four potential ports HV to carry out at least first three potential differential measurements V0, V1, V2;
a first current sensor HL1 to carry out a first measurement of the current passing through an electrical conductor BB1, BB2 of said power interface;
first actuation means LD to control the opening and closing of a first pair of electrical switches (INT1, INT2) of said power interface;
processing means (CPU) configured for:
acquiring said differential measurements and said current measurement,
controlling said actuation means.

The processing means CPU consist of a programmable microprocessor known per se. It comprises interface means DATA BUS to allow an operative interface between the microprocessor and a vehicle data network. This interface is normally based on the CAN bus or LIN technology, but other protocols may be implemented.

This interfacing allows the vehicle control unit (not shown) not only to communicate with the processing unit CPU of the device D, but also to issue commands that allow controlling the opening and/or closing of the switches INT1, INT2, INT3, INT4, both to deal with emergency conditions, for example, the opening of the INT1 and INT2 switches in the event of an impact on the car, and to allow recharging of the battery pack by opening the switches INT1 and INT2 and closing the switches INT3 and INT4, as described in detail below.

Moreover, the interface means can be integrated in the microprocessor or constituted by a second microprocessor operatively connected to the first microprocessor. In this second case, it is possible to perform a galvanic isolation between the first microprocessor and the second microprocessor, as described in the following.

According to the present invention, the device D is included in a closed container C, made of insulating material, comprising at least said four ports and containing said first current sensor, said actuation means and said processing means.

Moreover, the container comprises connection means LG, TG to allow a mechanical coupling between the container C and the electrical conductor BB1 or BB2.

In FIG. 1, the signal BB1/BB2 indicates that the device D can be indifferently fastened on one of the electrical conductors BB1 or BB2.

The coupling means integrate one of the aforementioned first four potential ports, so that a mechanical coupling between said container and said conductor automatically causes a galvanic connection between said potential port and said electrical conductor.

Preferably, said connection means comprise a longitudinal groove LG allowing a complementary engagement of said container on said electrical conductor BB1/BB2.

Generally, electrical conductors have a parallelepiped shape and therefore also the LG groove has a parallelepiped shape designed to obtain a fairly firm engagement on the conductor.

The edges of the groove there may be provided with elastic clip elements that allow the device to be inserted on the conductor and prevent its consequent disengagement. Alternatively, as shown in FIG. 1a, the connection means comprise revolving tabs TG, which are revolving remaining on the lower surface of the container C to be able to protrude on the groove LG in the locked condition, as shown in FIG. 1a, thus locking inside it the conductor BB1 or BB2.

Figure 1A:
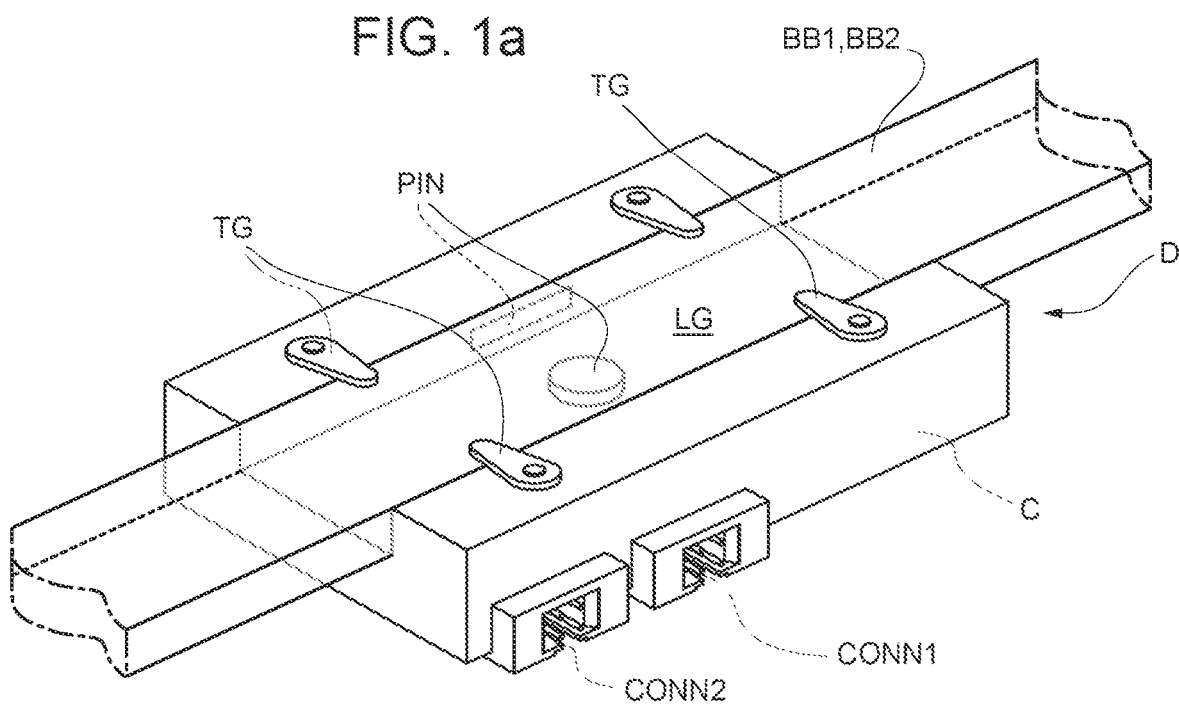
FIG. 1a shows a bottom view of the device shown in FIG. 1.

Although FIG. 1a shows four revolving tabs TG, even only one tab may be used for each side of the container and furthermore, on the one side the tab(s) can be stationary, while on the other side it is/are revolving to allow fastening and releasing the container from the conductor. Alternatively, the container is fastened to the conductor by means of a screwed plate so as to clamp the conductor between the plate and the container.

Alternatively, a hole is made in the conductor and the fastening is carried out by means of a passing screw, which forms a thread in a seat made in the groove.

A metal electrode PIN is interposed between the container and the conductor, or the same fastening plate can be metallic to define an electrical connection between the conductor and one of the first four ports through one of the screws that fasten the plate at the bottom of the container.

In other words, while the container is made of insulating material to contain the various devices described above, its interface, i.e. the groove LG, with the electrical conductor to which it is to be fastened, includes at least one metal portion which allows acquiring the potential of the same conductor, thus defining one of the potential ports.

The PIN metal electrode can, for example, be a spring-loaded element that protrudes from a wall of the LG groove to contact the conductor BB1 or BB2.

There are further alternatives including one or a pair of parallel plates arranged on one of the sides of the groove, on the opposite sides of the groove when using a pair of plates clamping said electrical conductor between them when said container is operatively connected to said electrical conductor.

According to a preferred variant of the invention, the electrode PIN allows the electrical circuit to carry out temperature measurements through the same electrode. Therefore, the electrode PIN has the dual function of allowing a measurement of potential and temperature.

In fact, when the device is fastened near the battery pack, the temperature of the conductors makes it possible to estimate the temperature inside the battery pack. The electrode, obviously made of metallic material, heats up and a temperature sensor associated with it inside the container C allows measuring the temperature of the electrode so that the CPU is able to estimate the temperature inside the battery pack.

Figure 2:
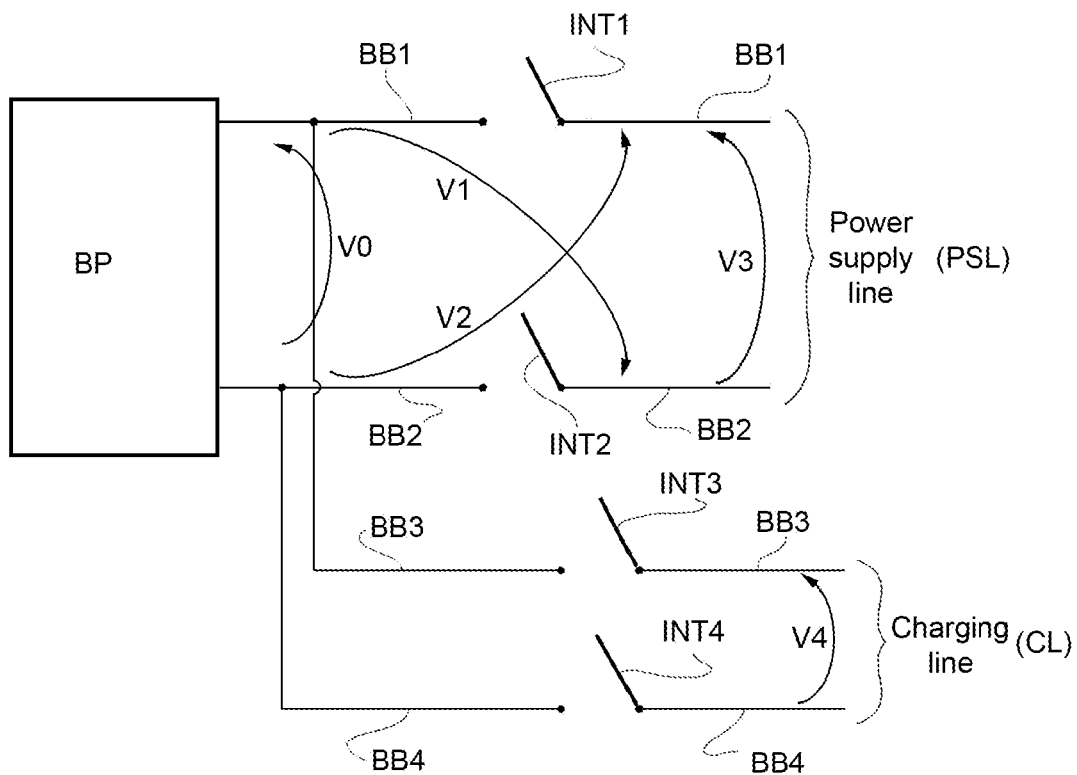
FIG. 2 shows a measurement scheme applied to an electrical interface between said propulsion battery and a vehicle electric power network.

With reference to FIG. 2, the aforementioned four potential ports are connected to the ends of the switches, i.e. they are connected to the power supply line PSL upstream and downstream of the switches.

With four ports, three voltage sensors are sufficient to know the voltage upstream of the interface, namely:
the voltage V0 measured between the terminals of the propulsion battery and the power interface, the voltage V1 between a point upstream of the first switch INT1 and a point downstream of the second switch INT2, the voltage V2 between a point upstream of the second switch INT2 and a point downstream of the first switch INT1.

The term "voltage" means a potential difference between two points.

The voltage V3 can be indirectly obtained through the relations $$V3=V0+V\text{int}1-V\text{int}2;$$

$$V\text{Int}1=V2-V0;$$

$$V\text{Int}2=V1+V0;$$

hence $V3=V2-V1-V0$

From the aforesaid it is clear that the four voltage measurements allow monitoring the two switches INT1 and INT2.

This does not mean that four voltage sensors or a different measurement scheme cannot be used.

As long as no battery charging sockets are present, or if present, as long as they use the same power supply line PSL, then the present device can be fastened in any of the four points upstream or downstream of one of the switches.

Figure 4:
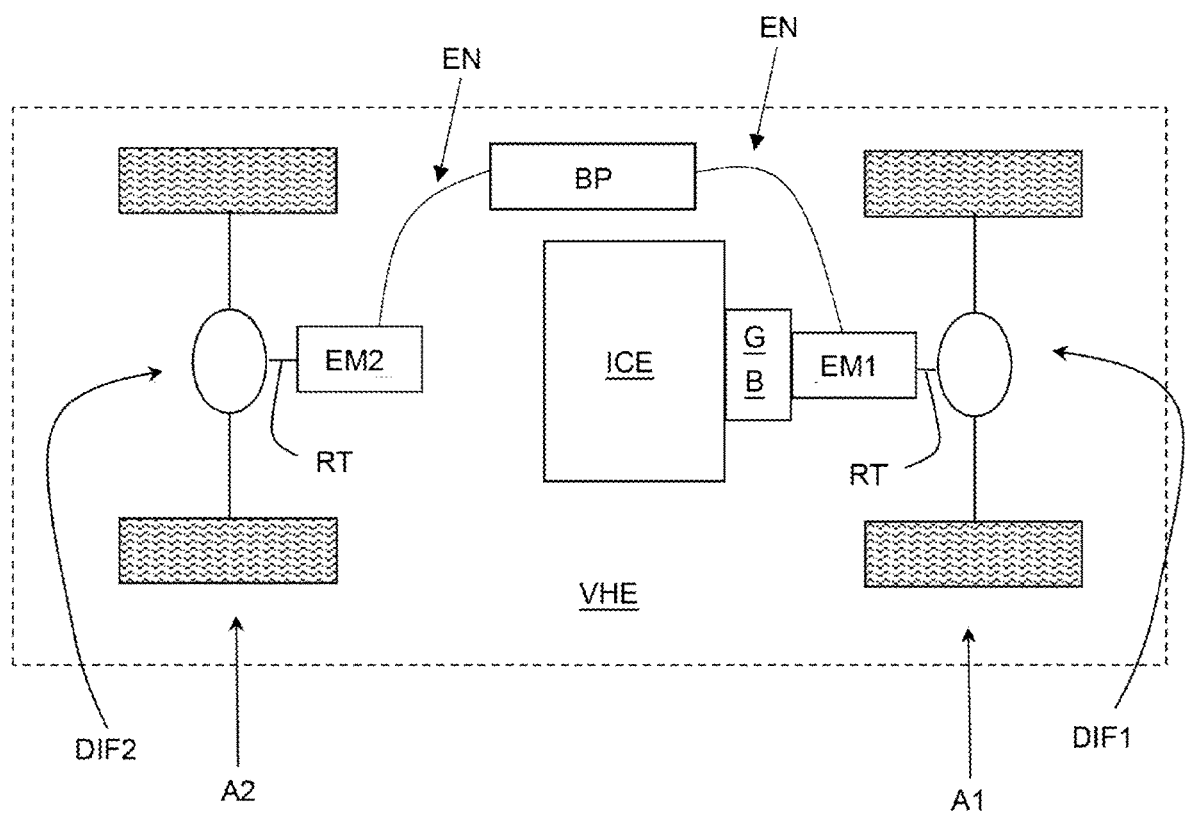
FIG. 4 shows a diagram of a hybrid or electric vehicle comprising the device of FIGS. 1 and 3.

The comparison of FIGS. 3 and 4 shows that the power supply line PSL is indicated differently from the on-board vehicle power line EN because this latter can be much more extensive and comprises inverters and other known devices to selectively supply the one or more electric motors that cause the propulsion of the electric vehicle.

In fact, FIG. 4 shows two electric propulsion motors but there could be only one or there could be three, one of which for an entire axle, e.g. the rear axle, and two electric motors, namely one for each of the front wheels. Obviously, inverters must be implemented for the selective control of each electric motor.

FIG. 2 shows a specific configuration having a charging line CL with its own third and fourth conductors BB3 and BB4 and relative third and fourth switches INT3 and INT4 that are independent of the conductors and switches described above.

In order for these third and fourth switches to be effectively independent of the first two, it is clear that the parallel connection between the power supply line PSL and the charging line CL is upstream of the first switches INT1 and INT2, i.e. between them and the propulsion battery. In other words, the switches INT1 and INT3 are arranged in parallel just like the switches INT2 and INT4. In this case, it is advantageous to connect the device D to one of the conductors BB1 or BB2 upstream of the point of connection in parallel between the pair INT1 and INT3 and the pair INT2 and INT4 to be able to measure both currents supplied by the battery and currents absorbed by the battery during its charging.

According to the diagram of FIG. 2, the device D can further comprise:
  second two potential ports to carry out at least one further differential potential measurement V4;
  second actuation means LD to control the opening and closing of said third and fourth switches INT3, INT4, and the aforesaid CPU is configured to command said first pair of switches to open and said second pair of switches to close, when said further potential differential measurement V4 exceeds a predetermined threshold value.

With reference to the aforementioned parallel between the PSL and the CL, the voltage V0 is common to both the lines PSL and CL. The voltages V3 and V4 instead represent the situation downstream of the switches INT1-INT4.

If a voltage is measured downstream of the switches INT3 and INT4, this implies that the vehicle is connected to an external charging source and therefore this can contribute to a state switching, i.e. to closing the switches INT3 and INT4 and to opening the switches INT1 and INT2.

Also in this case, a voltage sensor is associated with the further two ports to carry out the measurement of the potential difference V4.

Obviously, the external charging source can comprise its own data communication interface configured to communicate indirectly with the CPU through the vehicle data network to cause the aforementioned state switching.

The supply of the device D can be derived directly from one of the four ports or, preferably, it can be made through a low voltage 12V-24V buffer battery (not shown), which allows the device to operate regardless of the propulsion battery charging state BP.

Although this leads to having two more conductors, it avoids implementing a DC/DC converter to supply the device. In fact, electronic components are generally supplied with voltages ranging between 3.2 and 48V. The propulsion battery, on the other hand, operates at minimum voltages of 100V but can also be sized to operate at more than 350V. It is therefore evident that it is necessary to reduce the voltage to supply the aforementioned device.

Even the variant with DC/DC integrated in the aforesaid container forms a preferred variant of the present invention.

According to a further preferred variant of the present invention, the device D comprises a second current sensor HL2 to carry out a second measurement of the current passing through said electrical conductor and wherein said first current sensor has a first measurable maximum current value that is at least one order of magnitude higher than a second maximum current value measurable by said second current sensor and wherein said processing means are configured to discard said first current measurement when said second current measurement is lower than a second maximum current value measurable by said second current sensor.

Advantageously, the implementation of two sensors having very different bottom-scale values allows an adequate estimate of the low consumptions that can "escape" a sensor having a bottom scale value that is an order of magnitude lower.

This allows a better estimate of the energy supplied by the propulsion battery.

Preferably, the aforementioned potential ports flow, all but one, into a quick-type connector CONN3. The other port, as described above, is implicit in the mechanical connection of the container C to the conductor BB1 or BB2 through the electrode PIN.

The aforementioned voltage sensors can be galvanically uncoupled from the respective ports by means of optocouplers, known per se.

According to another preferred variant, said sensors interface with the CPU by means of an optically coupled (microprocessor) ADC configured to perform an A/D (analogue-to-digital) conversion of said first measurements and/or second measurements and to galvanically uncouple the CPU analog line. Since it is not 5 the only possible alternative, the relative ADC block is shown dashed, namely the galvanic uncoupling can be carried out upstream of the A/D conversion or even between the CPU and the electrical connector CONN1. For example, the first or the second current sensor can be interfaced with the processing means by means of an operational opto-coupler (ADC) configured to carry out an A/D (analogue-to-digital) conversion of said first or second measurements, respectively.

This uncoupling, regardless of how it is carried out, protects the CAN or Lin vehicle data network from any galvanic connection with one of the conductors BB1 and/or BB2. In this case, in fact, the vehicle data network would be irreparably damaged.

The block PWS of FIG. 3 indicates a power supply circuit that receives electric power from the electrical connector CONN1, then stabilizing and adjusting it for the needs of the whole device D. In particular, it supplies the CPU, the interface device DATA BUS when it is external to the CPU, the ADC converter and the actuation means that control the opening and closing of the switches INT1 and INT2 and, if present, also of the switches INT3 and INT0.

The connector CONN1 "goes towards the vehicle", in the sense that it allows a data interconnection between the device D and the vehicle data network and, if the power supply is operated through the aforementioned buffer battery, it even allows the supply of the device C.

The connector CONN2, on the other hand, allows the connection between the actuation means and the switches INT1-INT2 and possibly INT3 and INT4.

Said actuation means can comprise relay switches and/or solid-state switches designed to control the aforementioned controllable electrical switches INT1-INT4.

According to a further preferred variant of the invention, the galvanic isolation between the CPU and the second DATA BUS microprocessor or between the second DATA BUS microprocessor and the vehicle data network is made by means of a galvanic uncoupling device DIS.

The present invention, with reference to FIGS. 2 and 4, also relates to an electric or hybrid vehicle VHE comprising:
an electric power network EN;
a transmission RT and
an electric motor EM1, EM2 mechanically associated with said transmission and electrically associated with said electric power network (EN), and
a propulsion battery BP operatively connected to said electric power network EN to supply said electric motor;
a first and a second positive and negative electrical conductor BB1, BB2, interposed between said propulsion battery and said electric power network, in which a first and a second electrical switch INT1, INT2 are respectively arranged on said first and second electrical conductor defining a power interface between said propulsion battery and said electric power network.

This vehicle further includes a control device D according to any of the variants described above, mechanically connected to one of said first or second electrical conductors BB1, BB2 and having said first four potential ports electrically connected upstream and downstream of each of said first and second switch to detect any opening and closing thereof.

Moreover, the vehicle can further comprise an electric charging socket (not shown) of said propulsion battery BP comprising a third and a fourth electrical conductor BB3, BB4 respectively connected to said first and second conductors BB1, BB2 between said propulsion battery and said first and second switches, i.e. upstream of said interface, wherein respective third and fourth switches INT3, INT4 are arranged on said third and fourth conductors and wherein said second two potential ports are electrically connected to said conductors to detect any opening and closing thereof. Thus, evidently, these ports are connected downstream of the switches INT3 and INT4.

Preferably, besides monitoring the further switches INT3 and INT4, the device D is able to control them by means of the aforementioned actuation means, independently of the first two switches INT1 and INT2. For example, second actuation means, distinct from the first or integrated in the first can be used.

With reference to FIG. 4, schematically showing a vehicle VHE, the first electric motor EM1 is associated with a first axle A1, whereas the second electric motor EM2 is associated with a second axle A2.

Optionally, an internal combustion engine ICE equipped with a relative GB transmission, e.g. shared with the second electric motor EM1, is also connected to the second axle. In FIG. 4, the schematized vehicle VHE comprises a gearbox GB arranged between a heat engine ICE and the electric motor EM1 to define the transmission RT. This does not mean that the latter cannot be arranged between the heat engine and the gearbox.

The configuration shown in FIG. 4 also shows a second electric motor EM2 associated with another transmission. For example, the first transmission transmits motion to the rear axle A1, whereas the second transmission transmits motion to the front axle A1 by means of respective differentials DIF1 and DIF2.

Obviously, the propulsion battery is connected to the EM1/EM2 motors by at least one inverter not shown.

Further embodiments of the described non-limiting example are possible without thereby departing from the scope of protection of the present invention and therefore comprising all equivalent embodiments for a person skilled in the art.

From the aforesaid description, the person skilled in the art is able to manufacture the object of the invention without introducing further construction details. The elements and characteristics shown in the various preferred embodiments, including the drawings, may be combined without, however, departing from the scope of protection of the present application. What has been described in the paragraph related to the prior art only provides a better understanding of the invention and does not represent a declaration of existence of what has been described. Furthermore, if not specifically excluded in the detailed description, what has been described in the paragraph related to the prior art is to be considered as an integral part of the detailed description.

The invention claimed is:

1. A power interface control device of a vehicle propulsion battery comprising:
a single closed container made of insulating material, wherein the single closed container houses:
at least four potential ports configured to carry out at least three potential differential measurements for electrical conductors associated with a power supply line interposed between a propulsion battery and a vehicle data network, the power supply line including first and second electrical conductors (BB1, BB2), wherein a first and second electrical switch (INT1, INT2) are respectively arranged on the first and second electrical conductors when in contact therewith, wherein the at least four potential ports are electrically connected upstream and downstream of each of said first and second switches (INT1, INT2) to detect any opening and dosing thereof, wherein the at least first three potential differential measurements comprise a voltage V0 measured between terminals of the propulsion battery and a power interface, a voltage V1 measured between a point upstream of a first switch (INT1) and a point downstream of a second switch (INT2) in the power supply line, and a voltage V2 measured between a point upstream of the second switch (INT2) and downstream of the first switch (INT1) in the power supply line, wherein V3 downstream from the power interface is calculated from V0, V1 and V2 voltages;
a first current sensor to carry out a first measurement of the current passing through one of the first and second electrical conductors (BB1, BB2) of said power interface;
actuation means to control opening and closing of the first and second electrical switches of said power interface;
processing means configured for:
acquiring said differential measurements and said current measurement,
controlling said actuation means; and
interface means to allow an operational interfacing between said processing means and the vehicle data network;
wherein the single closed container further comprises connection means to allow a mechanical coupling between the container and both the first and second electrical conductors (BB1, BB2), and an electrical coupling between one of the at least four potential ports in the container and one of the first and second electrical conductors of the power supply line via a first connector (CONN1) to provide power directly to the device, wherein a remainder of the at least four ports are in electrical communication with a third connector (CONN3) configured for connection via the interface means to the vehicle data network, wherein a second connector (CONN2) is configured to provide connection between the actuation means and at least first and second electrical switches (INT1, INT2) to detect and control any opening and closing of at least the first and second electrical switches (INT1, INT2).

2. The device according to claim 1, wherein the mechanical and electrical coupling between the container and said electrical conductor automatically causes a galvanic connection between one of said first four potential ports and said electrical conductor of the power supply line.

3. The device according to claim 1, wherein said connection means comprise a longitudinal groove designed to allow a complementary engagement of said container with said electrical conductor and wherein the electrical connection comprises an electrode arranged in a surface of said groove.

4. The device according to claim 3, wherein said electrode is a pin protruding from a bottom surface of said longitudinal groove.

5. The device according to claim 4, wherein said pin is designed to be fitted in a complementary hole made in said electrical conductor to avoid any axial sliding of the container along the conductor.

6. The device according to claim 4, wherein said pin is spring-loaded and configured to be pressed on said electrical conductor when said container is operatively connected to said electrical conductor.

7. The device according to claim 3, wherein said electrode coincides with at least one plate, arranged on at least one of the opposite walls of said groove, designed to clamp said electrical conductor in the groove when said container is operatively connected to said electrical conductor.

8. The device according to claim 1, further comprising within the single closed container:
second two potential ports of an electrical conductor associated with a charging line in a parallel relationship with the power supply line configured to carry out at least a further potential differential measurement of a voltage V4 upstream from third and fourth switches in the charging line;
actuation means to control the opening and closing of the third and fourth electrical switches,
and wherein said processing means are configured to open said first and second switches of the power supply line and to close said third and fourth switches in the charging line when said further potential differential measurement of voltage V4 exceeds a predetermined threshold value.

9. The device according to claim 1, wherein said processing means are further programmed to communicate said first three potential differential measurements for the V0, V1 and V2 voltages and/or a further potential measurement of voltage V4 and/or said first measurement of the current passing through said electrical conductor.

10. The device according to claim 1, further comprising a second current sensor to carry out a second measurement of the current passing through said electrical conductor and wherein said first current sensor has a first maximum measurable current value, which is at least one order of magnitude higher than a second maximum current value measurable by said second current sensor and wherein said processing means are configured to discard said first current measurement when said second current measurement is lower than a second maximum current value measurable by said second current sensor.

11. The device according to claim 1, wherein said voltages V0, V1, and V3 and/or said first current sensor are interfaced with said processing means by means of an operational opto-coupler (configured to carry out an analogue-to-digital conversion of said first measurements.

12. The device according to claim 10, wherein the single closed container further comprises two additional potential ports of an electrical conductor associated with a charging line including third and fourth switches, wherein the two additional ports are configured to carry out potential differential measurements associated with the charging line for measuring a voltage V4 upstream from the first, second, third and fourth switches, and wherein said two additional ports and/or said second current sensor are interfaced with said processing means by means of an operational opto-coupler configured to carry out an analogue-to-digital conversion of said second measurements.

13. The device according to claim 2, wherein a galvanic uncoupling device is interposed between said processing means and said interface means.

14. The device according to claim 1, wherein said interface means are connected with said vehicle data network by means of a galvanic uncoupling device.

* * * * *